(12) United States Patent
Becker et al.

(10) Patent No.: US 10,824,639 B2
(45) Date of Patent: Nov. 3, 2020

(54) SMART ELASTIC SCALING BASED ON APPLICATION SCENARIOS

(71) Applicant: SAP SE, Walldorf (DE)

(72) Inventors: Achim Becker, Kirkel (DE); Franz Faerber, Walldorf (DE); Florian Foebel, Buerstadt (DE); Kesavaprakash Vasudevan, Leimen (DE); Martin Weidner, Ubstadt-Weiher (DE); Jonathan Dees, Heidelberg (DE)

(73) Assignee: SAP SE, Walldorf (DE)

( * ) Notice: Subject to any disclaimer, the term of this patent is extended or adjusted under 35 U.S.C. 154(b) by 691 days.

(21) Appl. No.: 14/975,489

(22) Filed: Dec. 18, 2015

(65) Prior Publication Data
US 2017/0177685 A1    Jun. 22, 2017

(51) Int. Cl.
| G06F 16/00 | (2019.01) |
| G06F 16/27 | (2019.01) |
| G06F 16/22 | (2019.01) |
| G06F 16/2458 | (2019.01) |

(52) U.S. Cl.
CPC .......... *G06F 16/27* (2019.01); *G06F 16/2282* (2019.01); *G06F 16/2471* (2019.01)

(58) Field of Classification Search
CPC ......... G06F 17/30339; G06F 17/30545; G06F 17/3057; G06F 16/2282; G06F 16/2471; G06F 16/27
See application file for complete search history.

(56) References Cited

U.S. PATENT DOCUMENTS

| 9,886,348 | B2* | 2/2018 | Rath ................... G06F 11/1451 |
| 2002/0091814 | A1* | 7/2002 | Arendt .................. G06F 9/5061 709/223 |
| 2005/0015436 | A1* | 1/2005 | Singh ..................... G06F 16/27 709/203 |
| 2011/0225121 | A1* | 9/2011 | Cooper ............ G06F 17/30578 707/634 |
| 2011/0302135 | A1* | 12/2011 | Prophete ................. G06F 16/27 707/634 |
| 2013/0332484 | A1* | 12/2013 | Gajic ................ G06F 17/30286 707/770 |
| 2014/0304230 | A1* | 10/2014 | Simon ..................... G06F 16/27 707/634 |

(Continued)

OTHER PUBLICATIONS

Extended European Search Report issued in corresponding European Patent Application No. 16002498.0 dated Jun. 8, 2017, 7 pp.

(Continued)

*Primary Examiner* — Shew Fen Lin
(74) *Attorney, Agent, or Firm* — Klarquist Sparkman, LLP

(57) ABSTRACT

Technologies are provided for scaling applications via application scenarios. Portions of application resource content stored in a database are associated with application scenarios. The portions of the resource content associated with an application scenario are replicated to one or more computing nodes associated with the application scenario. Requests associated with the application scenario are transmitted to the one or more one or more computing nodes, where they are processed using the replicated portions of the resource content associated with the application scenario.

18 Claims, 10 Drawing Sheets

(56) References Cited

U.S. PATENT DOCUMENTS

2015/0032694 A1* 1/2015 Rajamani .......... G06F 17/30581
  707/625
2015/0261838 A1* 9/2015 Cadarette ................ G06F 16/27
  707/634

OTHER PUBLICATIONS

Manassiev et al., "Scalable Database Replication through Dynamic Multiversioning," *Proceedings of the 2005 Conference of the Centre for Advanced Studies on Collaborative Research*, Oct. 17, 2005, 14 pp.

Minhas et al., "Elastic Scale-Out for Partition-Based Database Systems," *2012 IEEE 28th International Conference*, Apr. 1, 2012, pp. 281-288.

Sakr et al., "Is Your Cloud-Hosted Database Truly Elastic?" *IEEE Ninth World Congress on Services*, 2013, pp. 444-447.

Chang et al., "Bigtable: A Distributed Storage System for Structured Data", 2006, 14 pages.

DeCandia et al., "Dynamo: Amazon's Highly Available Key-Value Store", 2007, 16 pages.

Faerber et al, "The SAP HANA Database—an Architecture Overview," Bulletin of the IEEE Computer Society Technical Committee on Data Engineering, 2012, 6 pages.

"Huawei FusionCloud," Huawei Technologies Co., Ltd., 2013, 12 pages.

Reddy, "Benefits of SAP HANA Vora," startup.focus, SAP website, visited Nov. 2, 2015, 2 pages.

"The Components of Datomic", downloaded on Nov. 3, 2015, from http://www.datomic.com/overview.html. 3 pages.

Tinnefeld et al., "Elastic Online Analytical Processing on RAMCloud," EDBT/ICDT '13, Mar. 18-22, 2013, 11 pages.

* cited by examiner

SMART ELASTIC SCALING BASED ON APPLICATION SCENARIOS

BACKGROUND

Applications can be scaled by increasing the number of servers available to store data used by the applications and to process requests for the applications. For example, an application that uses a database can be scaled by creating copies of the database on additional servers and using the additional servers to process data-related requests for the application. A typical approach is to copy all of an application's data to each additional server and use the additional servers to process all types of application requests. Such an approach requires considerable additional resources and does not always result in expected performance gains.

Therefore, there is room for improvement in technologies related to data replication in a database management system.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

In one embodiment, a method of scaling an application based on application scenarios, implemented by at least one computing device, comprises, in a database server system, receiving a request for data. The database server system comprises a database master node and multiple application scenario nodes. The database master node stores one or more tables associated with an application and the application scenario nodes store replicas of data from a subset of the one or more tables associated with the application, wherein the subset of the one or more tables that are replicated are associated with an application scenario. The method further comprises determining that the request for data is associated with the application scenario and processing the request on one or more of the application scenario nodes, wherein the processing comprises accessing the replicas of data stored on the one or more application scenario nodes.

In another embodiment, a database server system comprises a database master node and a plurality of application scenario nodes. The database master node comprises a processing unit and a memory, and stores resource content associated with an application comprising one or more database tables. The database master node is configured to determine whether requests for resource content are associated with an application scenario. The plurality of application scenario nodes comprises additional processing units and memories, and store replicas of at least part of the resource content associated with the application that is stored on the master database node. The replicated resource content is associated with an application scenario and the plurality of application scenario nodes are configured to process requests for resource content associated with the application scenario, using the replicated resource content.

In another embodiment, one or more computer-readable storage media store computer-executable instructions for causing one or more computing devices to perform a method of scaling an application based on application scenarios. The method comprises receiving an application scenario configuration and transmitting the application scenario configuration to a scale-out scenario cluster. The application scenario configuration comprises an identification of at least part of at least one table stored on a master database node and an identification of at least one procedure stored on the master database node that, when executed by a database engine, accesses and/or retrieves data stored in the identified at least part of at least one table. The scale-out scenario cluster comprises a distributed query processor and a plurality of scale-out nodes. The method further comprises associating multiple scale-out nodes, of the plurality of scale-out nodes in the scale-out scenario cluster, with the application scenario configuration and replicating the at least part of the at least one table and the identified at least one procedure to from the database master node to the scale-out scenario nodes associated with the application scenario configuration. The method further comprises receiving a request, at the distributed query processor, to execute one or more of the at least one procedure identified by the application scenario configuration, and executing the requested one or more procedure on one or more of the scale-out nodes associated with the application scenario configuration to access and/or retrieve data stored in the replicated at least one part of at least one table stored on the one or more scale-out nodes executing the one or more procedure.

As described herein, a variety of other features and advantages can be incorporated into the technologies as desired.

DETAILED DESCRIPTION

Example 1—Overview

Figure 1:
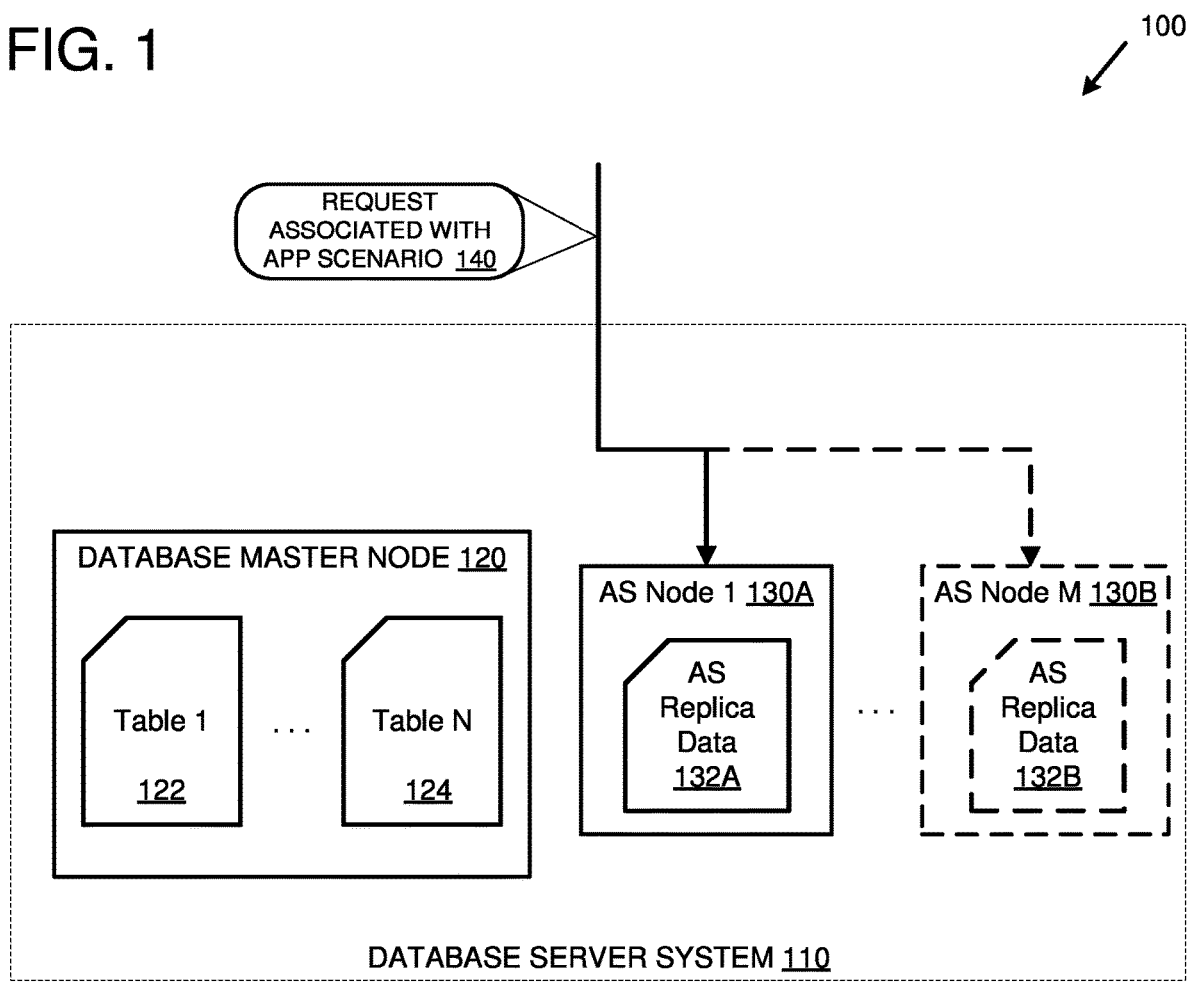
FIG. 1 is a block diagram depicting an example system scaling an application using application scenarios.

The following description is directed to technologies for scaling applications using application scenarios. Typical systems for scaling an application in a database context copy the entire database to additional servers. Such systems can be inefficient because each additional server that is added consumes storage, memory, and computing resources to manage the entire database for the application.

Furthermore, in some cases, certain portions of an application's functionality generate more requests and/or more processing work than other portions of the application's functionality. Improving the performance of such more intensive or "hot" portions of the application's functionality is frequently a motivation for scaling the application. However, such more intensive portions of the application's functionality often utilize only a subset or part of the application's data and other resource content that is stored in the database. The technologies described herein can be used to improve application scaling by replicating a subset or portion of an application's resource content on additional servers or computing nodes and using the additional servers or computing nodes to process requests that utilize the subset of the application's resource content.

As described herein, replication can be scaled for a given application scenario, and the technologies can independently scale the replication of application data or application resource content associated with application functionality that supports the given application scenario. Thus, if functionality for a particular application scenario is expected or detected, resources used for replication can be scaled to accommodate the particular application scenario. Over time, the distribution of work among the application scenarios can change, and scaling can elastically react accordingly.

In some embodiments, data associated with an application is stored on a database master node. A portion of the application data that is associated with an application scenario is replicated to one or more application scenario nodes. Application requests that are associated with the application scenario are then processed by the one or more application scenario nodes instead of the database master node.

In some embodiments, application resource content (database tables, portions of database tables, logic assets, and the like) is stored on a database master node. Parts of the application resource content are associated with one or more application scenarios. The one or more application scenarios are associated with multiple nodes in a clustered computing system, and application resource content is replicated from the database master node to the clustered computing system, which uses a distributed resource content replicator to transmit portions of the replicated resource content associated with application scenarios to the nodes associated with the respective application scenarios.

Requests identifying application resource content can be received at the database master node from a database client. The database master node can determine whether the identified resource content is associated with an application scenario. If all or part of the identified resource content is associated with an application scenario, the database master node transmits a response to the database client comprising a directive to transmit requests involving the identified resource content to the clustered computing system. The clustered computing system receives a request from the database client involving the identified resource content and uses a distributed request processor to route the request to one or more of the nodes associated with the application scenario for processing.

In some embodiments, application scenario configurations can be used to identify portions of application resource content that are associated with application scenarios. In such embodiments, the database master node can use the application scenario configurations to determine whether identified resource content is associated with one or more application scenarios. The clustered computing system can also use the application scenario configurations to identify application scenarios associated with received requests.

An application scenario configuration can also specify a number of nodes to be associated with an application scenario. Different numbers of nodes can be allocated to different application scenarios, and independent, per-application-scenario allocation can be supported. The number of nodes allocated to an application scenario can be changed to adapt to changing operating conditions. In some implementations, the clustered computing system can change the number of nodes allocated to an application scenario dynamically.

In some embodiments, an application scenario configuration that identifies a subset of application resource content associated with an application scenario can be received by a database master node; a number of application scenario nodes can be associated with the application scenario; the identified subset of resource content can be replicated from the database master node to the application scenario nodes; and requests involving the identified subset of application resource content can be routed to the application scenario nodes.

The technologies described herein can improve application performance by providing superior scaling functionality. The performance of the computers used to scale an application can also be improved. Using application scenarios to store copies of a subset of an application's resource content and process a subset of the application's requests can reduce the computing resources consumed by the additional nodes; thereby reducing the computing and storage costs associated with scaling the application.

The technologies can thus leverage replication in a computing network in a more targeted way, leading to less overall processing time (e.g., higher throughput) and/or better resource utilization as compared to simple blind replication.

Example 2—Systems and Methods for Scaling an Application Using Application Scenarios In any of the examples herein, a database server system can be provided for performing operations for scaling applications using one or more application scenarios.

FIG. 1 is a block diagram depicting an example system 100 that can scale an application using application scenarios. In the example, the database server system 110 comprises a database master node 120 and one or more application scenario nodes (e.g. AS Node 1 130A, . . . , AS Node M 130B).

The database master node 120 stores one or more database tables (e.g. Table 1 122, . . . , Table N 124). In the database server system 110, one or more of tables 122-124 are associated with an application.

An application scenario node 130A stores application scenario replica data 132A. Application scenario replica data 132A is a subset, or less than all, of the data stored in the one or more of tables 122-124 associated with the application. The subset of data is associated with an application scenario.

The database master node 120 can process requests for data associated with application scenarios using data stored in the one or more of tables 122-124 associated with the application. However, requests associated with certain application scenarios can be more frequent and/or computationally expensive than requests associated with other application scenarios. Performance of the application can be improved in some situations by replicating application data to additional nodes and using the additional nodes to process a portion of the request's received in database server system 110 for the application's data.

In example system 100, instead of replicating all data in the one or more of tables 122-124 associated with the application, a subset of the data that is necessary to process requests associated with a given application scenario is replicated to application scenario node 130A.

In the database server system 110, when a request 140 is received, a determination can be made whether a request 140 is associated with the application scenario. The determination of whether the request 140 is associated with the application scenario can be based on the resource content the request is targeting. For instance, request 140 may be for data stored in the one or more of tables 122-124 associated with the application. If the requested data is part of the subset of data associated with the application scenario, then the request is associated with the application scenario. In another example, the request 140 comprises a request to execute a procedure. If the procedure is associated with the application scenario, then the request is associated with the application scenario.

If it is determined that the request is associated with the application scenario, then, responsive to the determination, an application scenario node 130A processes the request using application scenario replica data 132A. In some embodiments, the processing comprises accessing application scenario replica data 132A and/or transmitting at least part of the replica data as a response. If it is determined that the request is not associated with the application scenario, then the request can be processed by the database master node 120, or another database node that is not associated with the application scenario.

The database server system 110 can comprise additional application scenario nodes associated with the application scenario, such as an application scenario node M 130B. The application scenario node 130B stores replicas 132B of data associated with the application scenario. In some embodiments, the replica data 132B is the same as replica data 132A. In such embodiments, requests associated with the application scenario (e.g. 140) can be processed by either application scenario node 130A or 130B. In other embodiments, the application scenario replica data 132A is partially or entirely different from application scenario data 132B. In scenarios where the replica data 132A is entirely different from the replica data 132B, a request associated with the application scenario can be partially processed by multiple of application scenario nodes 130A-B, and the results of the partial processing on the nodes can be combined after the processing on the nodes is complete. In scenarios where the replica data 132A is partially different from replica data 132B, some requests associated with the application scenario can be processed by application scenario node 130A or 130B, while other requests associated with the application scenario are processed by both application scenario nodes. Although two application scenario nodes are illustrated in FIG. 1, in practice, the technologies can support more than two application scenario nodes associated with the application scenario.

The database server system 110 can also comprise additional application scenario nodes associated with other application scenarios. For example, a second application scenario can be associated with a second subset of the data stored in the one or more of tables 122-124 associated with the application. The second subset of data can be replicated to one or more additional application scenario nodes and requests associated with the second application scenario can be processed by the one or more additional application scenario nodes.

The system 100 and any of the other systems described herein can be implemented in conjunction with any of the hardware components described herein, such as the computing systems described below (e.g., processing units, memory, and the like). In any of the examples herein, the inputs, outputs, application scenarios, tables, requests, databases, and environments can be stored in one or more computer-readable storage media or computer-readable storage devices. The technologies described herein can be generic to the specifics of operating systems or hardware and can be applied in any variety of environments to take advantage of the described features.

Figure 2:
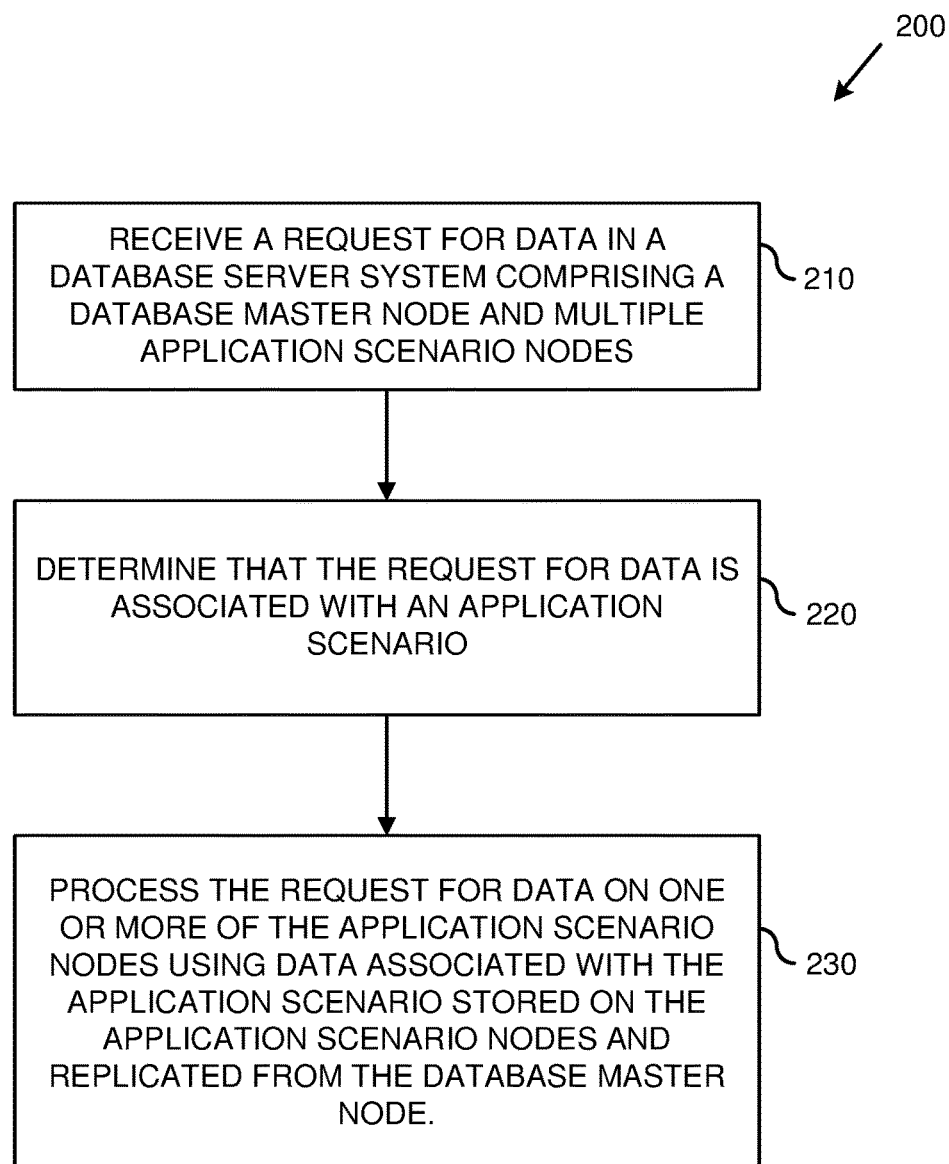
FIG. 2 is a flowchart depicting an example method of scaling an application using application scenarios.

FIG. 2 is a flowchart depicting an example method 200 of scaling an application using application scenarios that can be implemented in any of the example systems described herein. At 210, a request for data is received in a database server system comprising a database master node and multiple application scenario nodes.

At 220, it is determined that the request for data is associated with an application scenario.

At 230 the request for data is processed on one or more of the application scenario nodes using data associated with the application scenario stored on the application scenario nodes and replicated from the database master node. Such processing can be performed responsive to the determination that the request is associated with an application scenario.

The method 200 and any of the other methods described herein can be performed by computer-executable instructions (e.g., causing a computing system to perform the method) stored in one or more computer-readable media (e.g., storage or other tangible media) or stored in one or more computer-readable storage devices. Such methods can be performed in software, firmware, hardware, or combinations thereof. Such methods can be performed at least in part by a computing system (e.g., one or more computing devices).

The illustrated actions can be described from alternative perspectives while still implementing the technologies. For example, for 210 "receive a request" can also be described as "send a request."

Example 3—Example Database Master Nodes

In any of the examples described herein, a database master node can be a server configured to store and manage data in one or more database tables. A database master node can also be a virtual machine in a virtualized computing environment with access to virtualized hardware. In some embodiments, the database master node is referred to as a system of record, and the one or more tables stored on the database master node are referred to as master tables. In such embodiments, copies of the one or more tables, or copies of parts of the one or more tables, stored on other computing nodes are referred to as replicas. A node, or computing node, can be any example computing device or virtual machine running on virtualized hardware that is described herein. A database master node can comprises one or more processing units and a memory.

In practice, the database master node can take the form of a plurality of nodes that share responsibility for maintaining the master tables.

Example 4—Example Application Scenarios

In any of the examples described herein, application scenarios can represent portions of the functionality of applications. For example, in order to perform a particular task, or to fulfill a particular type of request, an application may utilize a portion an application's resource content, such as data stored in one or more tables and/or one or more logic assets. The particular task or type of request can be identified as an application scenario, in which case the portion of data and/or one or more logic assets are resource content associated with the application scenario. Application scenarios can also encompass multiple tasks and/or types of requests that utilize the same resource content. In practice, an application scenario can represent less than all (e.g., be a proper subset) of an application's functionality. In some cases, an application scenario represents a portion of the application's functionality that is isolatable and logically distinct. In some other cases, an application scenario represents a task or group of tasks performed by the application that comprise a use case or usage scenario of the application. In scenarios where the application is implemented using multiple services, an application scenario can represent one or more of the services.

An application scenario can be an identifiable portion of the application's functionality, such as an application feature, a use case, a usage scenario, or the like. For instance, an online shopping application may have application scenarios that allow a user to search for products, allow the user to view product details, recommend products to the user based on the user's search history and previous purchases, and allow a user to purchase products. In the case of this example shopping application, each of the application scenarios listed (product search, view product detail, product recommendation, and product purchase) represents an identifiable portion of the application's functionality that utilizes a subset of the application's data (e.g., less than all the data).

In practice, an application scenario can be represented internally with an identifier. Configuration of application scenarios for a given application scenario can identify resource content used in the application scenario as associated with the given application scenario. The replication of such resource content can then be scaled independently of resource content for other application scenarios.

Requests associated with certain application scenarios can be more frequent and/or computationally expensive than requests associated with other application scenarios. For instance, in the case of the example online shopping application discussed above, requests for data associated with the search and product recommendation application scenarios may be more frequent and/or more computationally expensive to process than requests for data associated with the view product detail and purchase product application scenarios. Therefore, if a product recommendation scenario is anticipated as being or is being frequently encountered by the system, the allocation level for the product recommendation level can be increased without replicating the entire database.

An application scenario can also be called a "replication scenario" because a list of resource content items, such as tables, parts of tables, and/or logic assets, associated with the scenario can identify resource content items to monitor for changes. When a resource content item on the list is changed, it can be replicated to application scenario nodes associated with the application scenario.

Example 5—Example Application Scenario Nodes

In any of the examples described herein, application scenario nodes can be servers with independent hardware components. In such an embodiment, application scenario nodes can receive requests associated with application scenarios via network connections, such as wired connections (e.g. Ethernet cables, fiber optic cables, or the like) or wireless connections (such as radio-based connections like Wi-Fi or the like). In other embodiments, the application scenario nodes are virtual machines in a virtual computing environment with access to virtualized hardware. In some other embodiments, the application scenario nodes are sockets in a non-uniform memory access (NUMA) architecture.

The application scenario nodes can be computing nodes in a clustered computing system. A clustered computing system can comprise a plurality of computing nodes. In some embodiments, computing nodes in a clustered computing system are networked in order to perform distributed computing operations.

An application scenario node can comprise resource content associated with an application scenario that is replicated from a master database node. As described herein, the resource content can be less than all the resource content stored by the master database node for the related application. Instead, only a subset (e.g., proper subset) need be stored.

Example 6—Example Computing Nodes

In any of the examples herein, a computing node can comprise at least one processing unit and a memory. In different or further embodiments, computing nodes are implemented using commodity hardware components. Computing nodes can also be implemented using virtualized hardware. In some embodiments, computing nodes have the same or similar hardware configurations. In other embodiments, computing nodes can have different hardware configurations. A database master node can be a computing node. An application scenario node can be a computing node associated with an application scenario.

Example 7—Systems and Methods for Scaling an Application by Replicating Application Scenario Resource Content In any of the examples herein, a database server system can be provided for performing operations for replicating application resource content associated with application scenarios.

Figure 3:
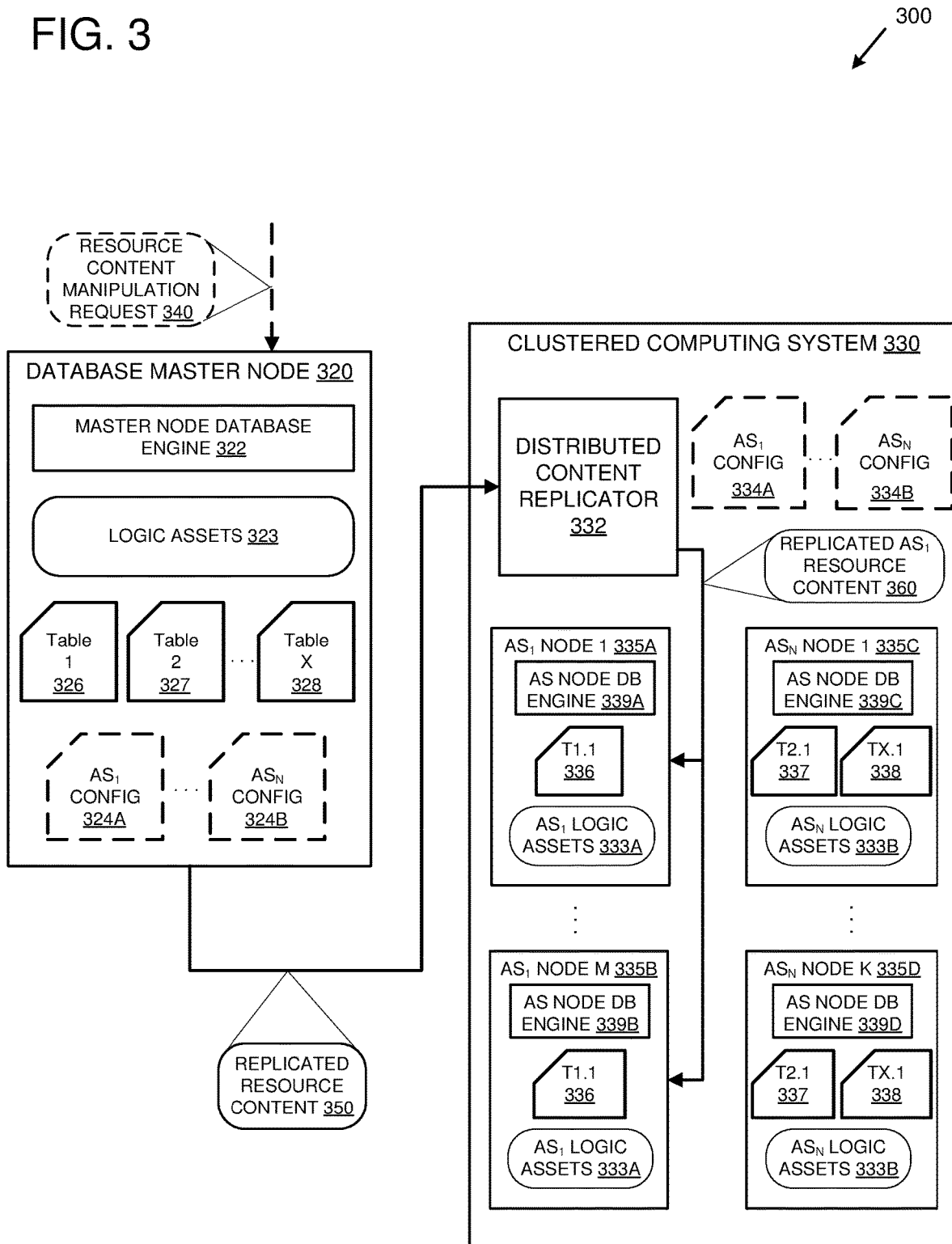
FIG. 3 is a block diagram depicting another example system scaling an application using application scenarios, wherein resource content is replicated from a database master node to application scenario nodes.

FIG. 3 is a block diagram depicting another example system 300 scaling an application using application scenarios. In the example system 300, resource content is replicated from a master database node 320 to application scenario nodes (e.g. 335A-D) in a clustered computing system 330.

The database master node 320 stores resource content, some or all of which can be associated with one or more applications. The resource content stored on the database master node 320 comprises multiple database tables Table 1 326, Table 2 327, . . . , Table X 328. Some or all of the data stored in one or more of tables 326-328 are associated with an application. In some embodiments, tables 326-328 store data for multiple applications. In different or further embodiments, the same data can be associated with more than one application. The database master node 320 also comprises logic assets 323.

The master node database engine 322 is configured to receive requests and process the requests using resource content stored on the database master node 320, such as logic assets 323 and/or data stored in one or more of tables 326-328.

Resource content stored on the database master node 320 can be associated with application scenarios.

The clustered computing system 330 comprises a plurality of computing nodes. Computing nodes in clustered computing system 330 can be associated with application scenarios (e.g. 335A-D). An application scenario nodes 335A-D comprise resource content associated with application scenarios that is replicated from master database node 320. Multiple application scenario nodes can be associated with the same application scenario. For example, a first application scenario ($AS_1$) in system 300 is associated with multiple application scenario nodes $AS_1$ Node 1 335A, . . . , $AS_1$ Node M 335B. Different sets of application scenario nodes can also be associated with different application scenarios. For example, another application scenario ($AS_N$) is associated with nodes $AS_N$ 1 335C, . . . , $AS_N$ Node K 335D. In some embodiments, $AS_1$ and $AS_N$ can be application scenarios for the same application. Alternatively, $AS_1$ and $AS_N$ can be associated with different applications. Although nodes and resource content associated with two application scenarios are illustrated in FIG. 3, the technologies described herein can be applied to scenarios involving more than two application scenarios as well.

In the example, $AS_1$ is associated with part of the data stored in Table 1 326, represented as T1.1 336, and one or more logic of logic assets 323, represented as $AS_1$ logic assets 333A. Data 336 and logic assets 333A are replicated to application scenario nodes 335A-B associated with $AS_1$. $AS_N$ is associated with part of the data stored in Table 2 327, represented as T2.1 337, part of the data stored in Table X 328, represented as 338, and one or more of logic assets 323, represented as $AS_N$ logic assets 333B. Data 337 and 338, and logic assets 333B are replicated to application scenario nodes 335C-D associated with $AS_N$.

Resource content stored on the database master node 320 is replicated, and the replicated resource content 350 is transmitted to a distributed content replicator 332. In some embodiments, distributed content replicator 332 is a computing node in clustered computing system 330. Alternatively, distributed content replicator 332 can be a separate server configured to communicate with the computing nodes in clustered computing system 330. The replicated resource content 350 comprises replicas of resource content associated with $AS_1$. The distributed content replicator 332 is configured to identify the portion of replicated resource content 350 associated with $AS_1$ (e.g. 360), and to transmit the replicated $AS_1$ resource content 360 to application scenario nodes 335A-B associated with $AS_1$.

In some scenarios, the replicated resource content 350 comprises replicas of resource content associated with multiple application scenarios. In such scenarios, distributed content replicator 332 can be configured to identify the separate portions of replicated resource content 350 associated with the different application scenarios and to transmit the separate portions of replicated resource content 350 to the separate sets of application scenario nodes associated with the respective application scenarios.

In some embodiments, the replicated resource content 350 comprises one or more transaction records, such as records that, when executed by an application scenario node engine (e.g. 339A-D) create, update, and/or delete resource content stored on an application scenario node (e.g. 335A-D). In some embodiments, the database master node 320 comprises a transaction monitoring system that tracks transactions executed by master node database engine 322 that involve data stored in tables 326-328, and/or logic assets 323. In such an embodiment, the transaction monitoring system can transmit tracked transactions as part of replicated resource content 350.

In some scenarios, replicas of resource content associated with an application scenario are already stored on application scenario nodes associated with the application scenario when replicated resource content 350 is received. In such scenarios, application scenario nodes associated with the application scenario may process parts of the replicated resource content associated with the application scenario by updating and/or adding to the replicas of resource content already stored on the application scenario nodes. For example, resource content stored on the database master node 320 can be associated with an application scenario, such as $AS_1$ or $AS_N$, and replicated to multiple application scenario nodes. Subsequently, part of the resource content associated with the application scenario may be modified on database master node 320. In such a scenario, the modification can be transmitted as part of replicated resource content 350 and processed on the application scenario nodes associated with the application scenario.

In some instances, the database master node 320 is configured to receive a resource content manipulation request 340 that can come from a source such as a database client, application server, or the like. The resource content manipulation request 340 can comprise a request to add, edit, and/or delete data stored in one or more of tables 326-328; a request to execute one or more of logic assets 323 that adds, edits, and/or deletes data stored in one or more of tables 326-328; a request to add, edit, and/or delete one or more of logic assets 323; or any combination thereof. If database master node 320 processes request 340 by manipulating resource content stored on database master node 320, then, responsive to manipulating the resource content, the data base master node 320 can transmit the manipulated resource content to distributed content replicator 332 as part of replicated resource content 350. Distributed content replicator 332 can then determine that at least part of the manipulated resource content is associated with an application scenario and transmit the at least part of the manipulated resource content to application scenario nodes associated with the application scenario. Alternatively, all or part of request 340 may be transmitted as part of replicated resource content 350 and processed by one or more application scenario nodes to manipulate resource content stored on the one or more application scenario nodes.

In some embodiments, the database master node 320 comprises one or more application scenario configurations, such as $AS_1$ configuration 324A, . . . , $AS_N$ configuration 324B. The one or more application scenario configurations associate resource content stored on database master node 320 with one or more application scenarios. For example, $AS_1$ configuration 324A associates Table 1 data T1.1 336 and logic assets 333A with application scenario $AS_1$. Similarly, $AS_N$ configuration 324B associates Table 2 data T2.1 337, Table X data TX.1 338, and logic assets 333B with application scenario $AS_N$. In these or different embodiments, application scenario configurations can be stored in clustered computing system 330 (e.g. $AS_1$ configuration 334A, . . . , $AS_N$ configuration 334B). The distributed content replicator 332 can be configured to use application scenario configurations to identify parts of replicated resource content 350 that are associated with application scenarios. For instance, distributed content replicator 332 can be configured to use $AS_1$ configuration 334A to determine replicated resource content 350 contains one or more replicas of resource content associated with $AS_1$. If at least part of replicated resource content 350 is identified in $AS_1$ configuration 334A, then the at least part of replicated resource content 350 is transmitted to $AS_1$ nodes 335A-B in replicated $AS_1$ resource content 360. Similarly, if at least part of replicated resource content 350 is identified in $AS_N$ configuration 334B, then the at least part of replicated resource content 350 is transmitted to $AS_N$ nodes 335C-D.

In an alternative embodiment, database master node 320 can use application scenario configurations 324A-B to identify portions of replicated resource content associated with one or more application scenarios and transmit indicators identifying these one or more associations along with replicated resource content 350.

In some implementations, an application scenario configuration can specify a number of application scenario nodes in clustered computing system 330 associated with an application scenario. For example, in such an implementation, $AS_1$ configuration 334A can indicate that M application scenario nodes are associated with application scenario $AS_1$. Similarly, $AS_N$ configuration 334B can indicate that K application scenario nodes are associated with application scenario $AS_N$.

The number of application scenario nodes specified by an application scenario configuration can be changed to dynamically adjust the number of application scenario nodes associated with the application scenario in clustered computing system 330. For instance, the number of application scenario nodes associated with $AS_1$ could be changed from M to M−1.

Responsive to the changing of the number of nodes, the number of application scenario nodes associated with $AS_1$ in clustered computing system 330 would be reduced by one (1). Contrastingly, the number of application scenario nodes specified by $AS_1$ configuration 335A could be increased from M to M+3. Responsive to the changing of the number of nodes, the number of application scenario nodes associated with $AS_1$ in clustered computing system 330 would be increased by three (3).

In some embodiments, if computing nodes are not available to associate with an application scenario, additional computing nodes can be dynamically allocated in clustered computing system 330. One or more of the newly allocated computing nodes can then be associated with $AS_1$. In some embodiments, the additional computing nodes can be dynamically allocated by distributed content replicator 332.

The collections of application scenario nodes associated with different application scenarios can be scaled independently of one another. For example, the number of application scenario nodes associated with application scenario $AS_N$ can be increased or decreased without affecting the number of application scenario nodes associated with application scenario $AS_1$. The increasing and/or decreasing can be performed manually via a user interface, and/or automatically.

The database master node 320 can be configured to receive an application scenario configuration that identifies part of the resource content stored on the database master node 320 and specifies a number of application scenario nodes. The database master node 320 is configured to transmit the application scenario configuration to clustered computing system 330. The clustered computing system 330 then associates a number of computing nodes with the application scenario equal to the number specified by the application scenario configuration. The database master node 320 replicates the identified part of the resource content and transmits the replicated part of the resource content to distributed content replicator 332. The distributed content replicator 332 uses the application scenario configuration to determine that the replicated part of the resource content is associated with the application scenario and transmits the replicated part of the resource content to the application scenario nodes associated with the application scenario.

Figure 4:
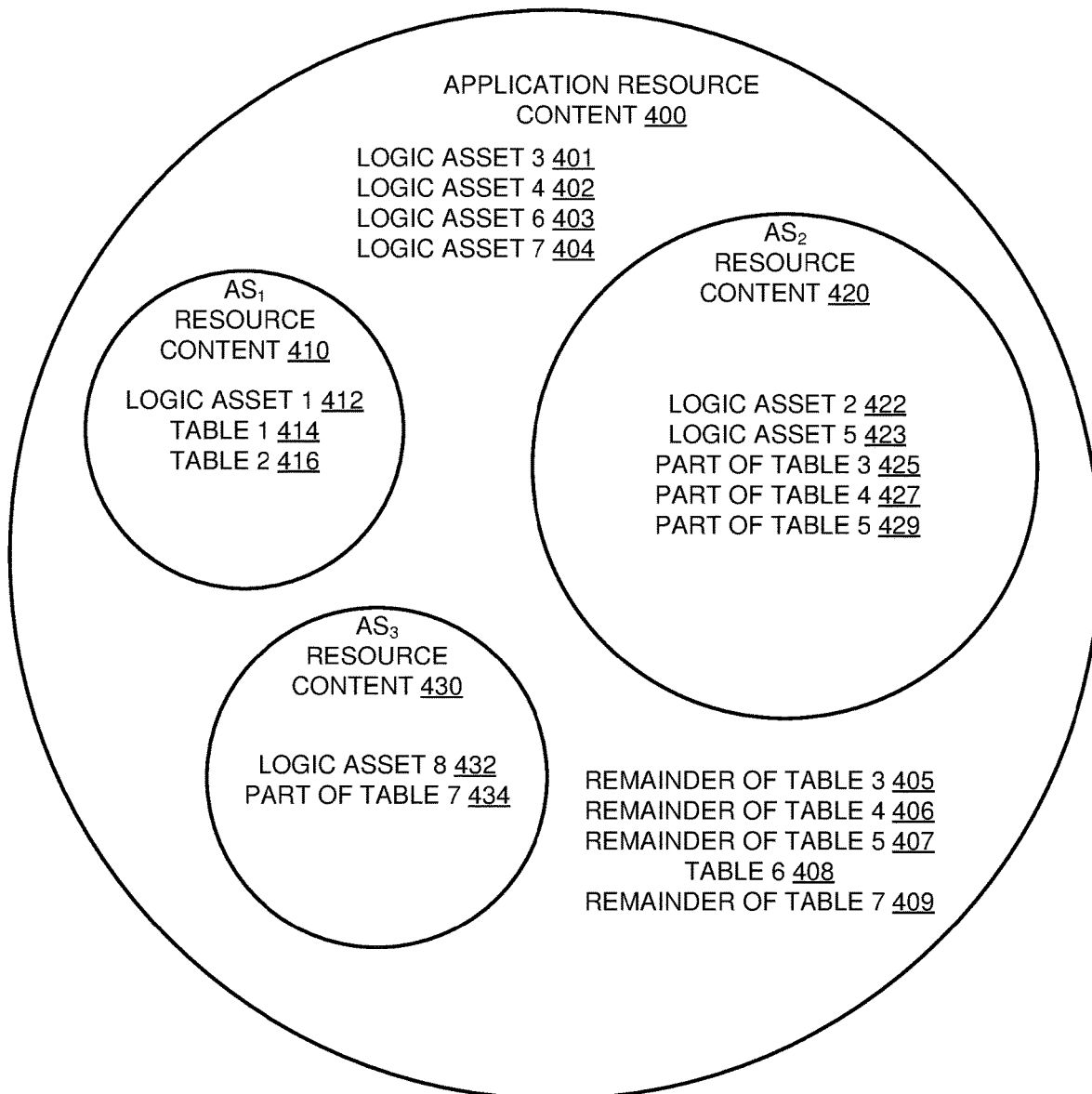
FIG. 4 is a diagram depicting subsets of application resource content associated with multiple application scenarios.

FIG. 4 is a diagram depicting subsets of application resource content 400 associated with multiple application scenarios 410, 420, and 430. Application resource content 400 can be resource content stored on a database master node, such as database master node 120 or database master node 320, that an application uses as part of it functionality. For example, application resource content 400 can comprise one or more database tables, one or more parts of one or more database tables, and/or one or more logic assets that are stored on a master database node and used by the application.

In some cases, an application scenario uses an identifiable subset of the application's resource content 400 when performing the subset of the application's functionality associated with the application scenario. For example, a first application scenario ($AS_1$) uses a subset 410 of the application resource content 400 comprising logic asset 1 412, table 414, and table 416. In the example, a second application scenario ($AS_2$) uses a second subset 420 of the application resource content 400 comprising logic asset 2 422, logic asset 5 423, part of table 3 424, part of table 4 427, and part of table 5 429. A part of a table can be, for example, one or more rows of the table, one or more columns of the table, one or more partitions of the table, or some other subset (i.e. less than all) of the data stored in the table. In the example, a third application scenario ($AS_3$) uses a third subset 430 of the application resource content 400 comprising logic asset 432 and part of table 7 434. In the example, logic asset 3 401, logic asset 4 402, logic asset 6 403, logic asset 7 404, remainder of tables 3-5 405-407, table 6 408, and remainder of table 7 409 represent resource content that are part of application resource content 400 but are not used by an application scenario. In this example, a remainder of a table represents one or more parts of the table that are not used by application scenarios.

Subsets 410, 420, and 430 are depicted in FIG. 4 as differently sized circles to illustrate that different application scenarios can use different amounts of an application's resource content in practice. For instance, $AS_1$ may use a relatively small amount of application resource content 400, while AS2 may use a relatively large amount of application resource content 400.

Because the degree of replication can be targeted to a given application scenario, the technologies can independently scale the replication of application resource content associated with application functionality that supports a given application scenario. Over time, the distribution of work among the application scenarios can change, and scaling can elastically react accordingly.

Figure 5:
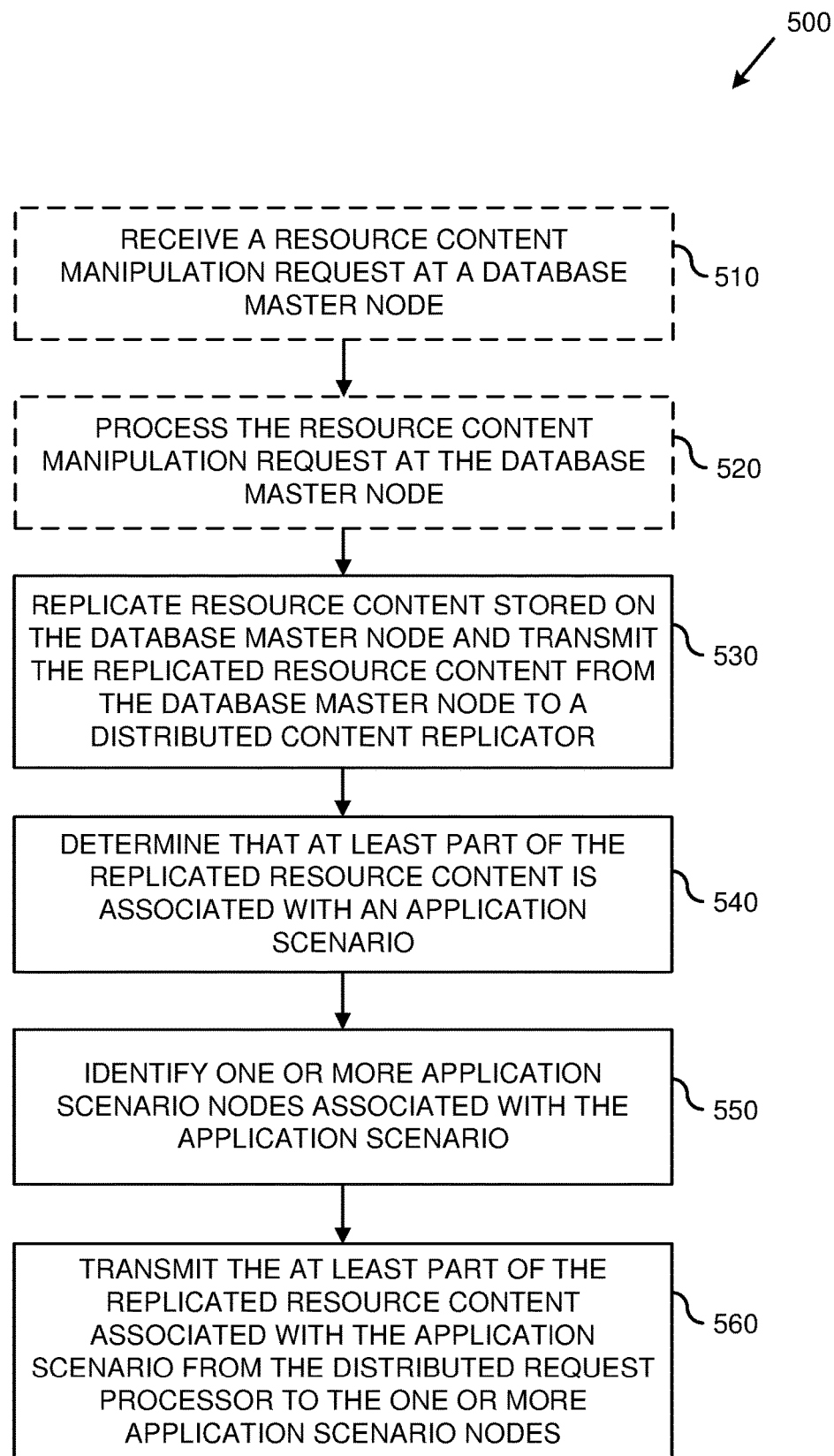
FIG. 5 is a flowchart depicting an example method of replicating resource content from a database master node to application scenario nodes.

FIG. 5 is a flowchart depicting an example method 500 of replicating resource content from a database master node to application scenario nodes. The method 500 can be performed using any of the example systems described herein. At 530, resource content stored on a database master node is replicated and transmitted to a distributed content replicator. Optionally, the resource content replication and transmission at 530 occurs in response to receiving a resource content manipulation request at the database master node at 510 and processing the resource content manipulation request at the database master node at 520.

At 540, it is determined that at least part of the replicated resource content is associated with an application scenario.

At 550, one or more application scenario nodes associated with the application scenario are identified.

At 560, the at least part of the replicated resource content associated with the application scenario is transmitted from the distributed request processor to the one or more application scenario nodes associated with the application scenario.

Example 8—Example Resource Content

In any of the examples described herein, resource content can comprise data stored in one or more database tables and/or one or more logic assets.

In any of the examples described herein, database tables can comprise data records organized into one or more rows and/or one or more columns. Tabular data can be stored in a row-wise format, a column-wise format, or some combination thereof. Tables can also comprise collections of documents, objects, entities, or the like. In some embodiments, relationships between records in different tables can be defined.

In any of the examples described herein, logic assets can define functionality that accesses, processes, and/or manipulates data stored in one or more database tables. Logic assets can take several forms. Logic assets can be programs written in an imperative programming language such as C, Java, JavaScript, or the like. Logic assets can also be declarative, such as SQL scripts, procedures, functions, views, triggers, etc. Logic assets can be interpreted by a database engine. In some embodiments, some logic assets can be compiled and stored in binary representations that can be executed by a database engine.

Resource content can be associated with one or more applications. Resource content associated with an application (or application resource content) can comprise one or more database tables, portions of database tables (such as part of the data stored in the one or more tables), and/or one or more logic assets. In some embodiments, one or more database tables store an application's data and are accessed exclusively by the application. In other or further embodiments, one or more database tables store data belonging to the application and one or more additional applications and are accessed by the application and the one or more additional applications as well. The association between the application and the one or more database tables can be a logical association, wherein the application identifies the one or more database tables that it accesses as the one or more tables with which it is associated. Alternatively, or additionally, a database master node can identify the one or more database tables with which the application is associated.

In some embodiments, one or more logic assets are defined as part of an application's implementation. In different or further embodiments, logic assets are defined separately from an application, but are used by the application as part of the application's functionality.

In practice, resource content can be identified by a resource content identifier. Associations between resource content and application scenarios can thus be identified by storing a relationship between an application scenario identifier and a resource content identifier.

Example 9—Example Resource Content Manipulation Requests

In any of the examples described herein, a resource content manipulation request can comprise a request to alter or change resource content. The resource content manipulation can be a request to add, edit, and/or delete data stored in one or more database tables; a request to execute one or more logic assets that adds, edits, and/or deletes data stored in one or more database tables; a request to add, edit, and/or delete one or more of logic assets 323; or any combination thereof. A resource content manipulation request can be a request to add, edit, and/or delete an application scenario configuration.

Example 10—Example Application Scenario Configurations

In any of the examples described herein, an application scenario configuration can associate resource content with an application scenario. For example, an application scenario configuration can identify one or more database tables, and/or one or more parts of one or more database tables that are associated with an application scenario. A part of a database table associated with an application scenario can be one or more table rows, one or more table columns, and/or a subset of table data values. In some embodiments, a part of a table associated with an application scenario can be identified by a filter criteria, such as a database query comprising a one or more predicates, and/or one or more projections. In further or different embodiments, a part of a table associated with an application can be identified by a temporal criteria, such as a subset of records in a table created and/or modified within a given time range. An application scenario configuration can also identify one or more logic assets associated with the application scenario.

An application scenario configuration can also specify how many application scenario nodes are associated with an application scenario. The application scenario configuration can specify how many application scenario nodes are associated with the application scenario by specifying a number of computing nodes to be associated with the application scenario in a clustered computing environment. The number of application scenario nodes can be specified as a positive integer. The number of application scenario nodes can be specified as a percentage of the computing nodes in a clustered computing environment.

In cases where the application scenario nodes do not possess the same or similar computing hardware, the application scenario configuration can also specify minimum hardware requirements for application scenario nodes associated with the application scenario. Example hardware requirements can include number of processing units, speed of processing units, available memory size, available storage size, or the like.

In some embodiments, the application scenario configuration can also specify a scaling rate. The scaling rate can be used by a clustered computing environment to dynamically adjust the number of application scenario nodes associated with the application scenario based on changes in operating conditions on the application scenario nodes associated with the application scenario. Smart elastic scaling can thus be implemented.

For example, if the average number of requests per application scenario node per unit of time increases above a specified threshold, the scaling rate can dictate a rate at which additional application scenario nodes are associated with the application scenario until the average number of requests per application scenario node per unit of time falls below the specified threshold. Similarly, the average number of requests per application scenario node per unit of time falls below another specified threshold, the scaling rate can dictate the rate at which scale-out nodes are dissociated from the application scenario. In some embodiments, a scaling rate can be selected from a set of predefined options, such as a high scaling rate, a medium scaling rate, or a low scaling rate, wherein the high scaling rate scales association an dissociation of scale-out nodes more aggressively than the medium scaling rate, which scales association an dissociation of scale-out nodes more aggressively than the low scaling rate.

Application scenario nodes associated with one application scenario can be re-associated with another application scenario after they have been dissociated, and replication can automatically populate application-scenario-specific resources at the re-associated nodes.

An application scenario configuration can be stored as a file in a file system, as one or more records in a database table, as an object in an object store or collection, or the like.

Example 11—Example Database Clients

In any of the examples described herein, a database client can be a server or computing node configured to transmit application requests and receive responses. For example, a database client can be a user computing device configured to transmit requests and receive responses over a network connection. A database client can also be an application server configured to receive requests from application users and, responsive to the requests from application users, transmit requests to a database master node and/or nodes in a clustered computing environment.

Example 12—Systems and Methods for Scaling an Application by Directing Requests to Application Scenario Nodes In any of the examples herein, systems and methods can be provided for scaling an application using application scenarios by directing certain requests to computing nodes associated with application scenarios.

Figure 6:
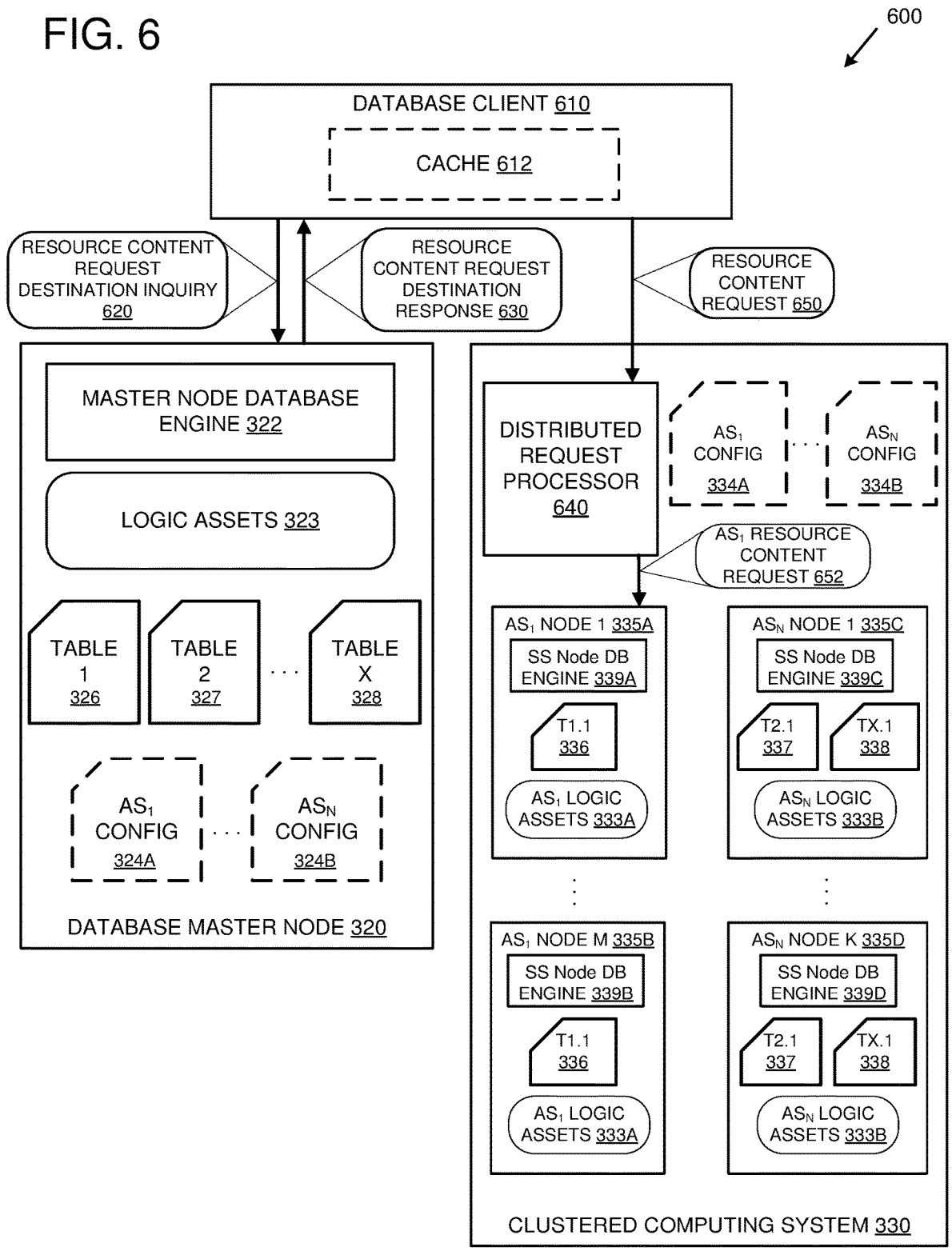
FIG. 6 is a block diagram depicting another example system scaling an application using application scenarios, wherein a database master node directs requests involving resource content associated with application scenarios to application scenario nodes.

FIG. 6 is a block diagram depicting another example system 600 for scaling an application using application scenarios, wherein requests involving application scenario resource content are processed on one or more application scenario nodes.

In the example, a database master node 320 is configured to receive a resource content request destination inquiry 620 from a database client 610 that identifies resource content stored on the database master node 320. The identified resource content can comprise one or more of tables 326-328, one or more parts of one or more of tables 326-328, and/or one or more of logic assets 323. The database master node 320 is configured to determine whether at least part of the identified resource content is associated with an application scenario. If at least part of the identified resource content is associated with an application scenario, then the database master node 320 can transmit a resource content request destination response 630 to the database client 610 indicating to the database client 610 to transmit requests involving the at least part of the identified resource content to the clustered computing system 330. For instance, if the identified resource content comprises a procedure associated with an application scenario, then the database master node 320 transmits the resource content request destination response 630 to the database client 610 indicating to the database client 610 to transmit requests involving the procedure to the clustered computing system 330.

In embodiments where the database master node 320 comprises one or more application scenario configurations, the database master node 320 can use the one or more application scenario configurations to determine whether at least part of the identified resource content is associated with an application scenario. For instance, if at least part of the identified resource content is all or part of the same part of Table 1 326 that comprises T1.1 336, or at least one of logic assets 333A, then the database master node 320 can use $AS_1$ configuration 324A to determine that the at least part of the identified resource content is associated with application scenario $AS_1$.

In some embodiments, the resource content request destination inquiry 620 comprises one or more requests to access, manipulate, and/or execute the identified resource content stored on database master node 320. For instance, the content request destination inquiry 620 can comprise a request to access, manipulate, and/or execute a procedure stored on the database master node 320. In such embodiments, if the database master node 320 determines that at least part of the identified resource content is associated with an application scenario, a resource content request destination response 630 can comprise an indication to the database client 610 to re-transmit all or part of the resource content request destination inquiry 620 to the clustered computing system 330. If no part of the identified resource content is associated with an application scenario, then the database master node 320 can process the resource content request destination inquiry 620 using the master node database engine 322 and transmit one or more results of the processing to the database client 610 as part of the resource content request destination response 630. In some scenarios, if some but not all of the identified resource content is associated with one or more application scenarios, database master node can process a part of resource content request destination inquiry 620 that does not involve a part of the resource content associated with an application scenario and transmit the result of the partial processing as part of resource content request destination response 630.

Alternatively, the resource content request destination inquiry 620 can be transmitted by the database client 610 to the database master node 320 in order to determine whether to transmit requests involving the identified resource content to the database master node 320 or the clustered computing system 330.

Application scaling using one or more application scenarios can be enabled for some application users and not for others. For example, one application user may choose to enable scaling for a particular application scenario, while another user may not. In such a scenario, requests for the first application user involving the identified resource content can be transmitted to the clustered computing system 330 and processed by one or more nodes assigned to the application scenario, while requests for the other application user involving the identified resource content are transmitted to the database master node 320 and processed by the database master node 320.

If resource content request destination response 630 indicates to transmit requests involving at least part of the identified resource content to the clustered computing system 330, the database client 610 can transmit a resource content request 650 involving the at least part of the identified resource content to the clustered computing system 330. In the example system 600, the clustered computing system 330 comprises a distributed request processor 640 configured to receive the resource content request 650. In some embodiments, the database client 610 is configured to transmit the resource content request 650 to a distributed request processor. In other embodiments, the database client 610 transmits the resource content request 650 to another server in a clustered computing system 330, such as a gateway server, that is configured to route the request to the distributed request processor 640.

Optionally, the database client 610 can comprise a cache 612 for storing an association between the identified resource content and the clustered computing system 330. The database client 610 can refer to the cache 612 before transmitting subsequent requests involving the identified resource content in order to determine that the subsequent requests should be transmitted to the clustered computing system 330.

The distributed request processor 640 analyzes the resource content request 650 and determines which application scenario is associated with the request. For example, the distributed request processor 640 can example request 650 to determine the resource content the request 650 involves and then determine which application scenario is associated with the resource content. The distributed request processor 640 then selects one or more nodes assigned to the application scenario and transmits the resource content request 650 to the one or more nodes for processing.

For example, in FIG. 6 distributed request processor 640 determines that the resource content request 650 is associated with the application scenario $AS_1$ and routes the $AS_1$ resource content request 652 to a node 335A for processing. The $AS_1$ resource content request 652 may be the same as the resource content request 650, or it may represent a part of the resource content request 650. In some scenarios, the resource content request 650 comprises multiple requests that are associated with different application scenarios. In such a scenario, a distributed request processor 640 can transmit the multiple requests separately to nodes assigned to the different application scenarios. For example, in such a scenario, the $AS_1$ resource content request 652 is one of multiple requests contained within the resource content request 650, and the distributed request processor 640 transmits the $AS_1$ resource content request 652 to the node 335A because the request 652 is associated with application scenario $AS_1$.

In some embodiments, the distributed request processor 640 transmits the request to one of the nodes assigned to the application scenario that is determined to be less busy than other nodes assigned to the application scenario. For instance, the distributed request processor 640 may transmit the $AS_1$ resource content request 652 to the node 335A if other nodes assigned to the application scenario $AS_1$ (e.g. 335B) are busy processing other requests, or if the node 335A has a lower resource utilization measurement than other nodes assigned to application scenario $AS_1$.

The distributed query processor 640 can transmit the request, or parts of the request, to more than one node assigned to the application scenario. For instance, in some scenarios it is possible for multiple nodes to process separate parts of resource content request 650 independently. In such scenarios, the distributed request processor 640 can use distributed computing techniques, such as map-reduce, to use multiple nodes assigned to the application scenario to handle the resource content request 650. Distributed request processor 640 can then assemble partial results received from the multiple nodes to create a combined result.

The distributed request processor 640 can use one or more application scenario configurations when determining which application scenario is associated with resource content request 650. For example, if the resource content request 650 involves all or part of Table 1 data comprising T1.1 336 and/or one or more of logic assets 333A, then the distributed request processor 640 can use the $AS_1$ configuration 334A to determine that the resource content request 650 involves resource content associated with the application scenario $AS_1$. The distributed request processor 640 can then transmit the $AS_1$ resource content request 652 to one or more of nodes 335A-B associated with the application scenario $AS_1$ for processing.

Figure 7:
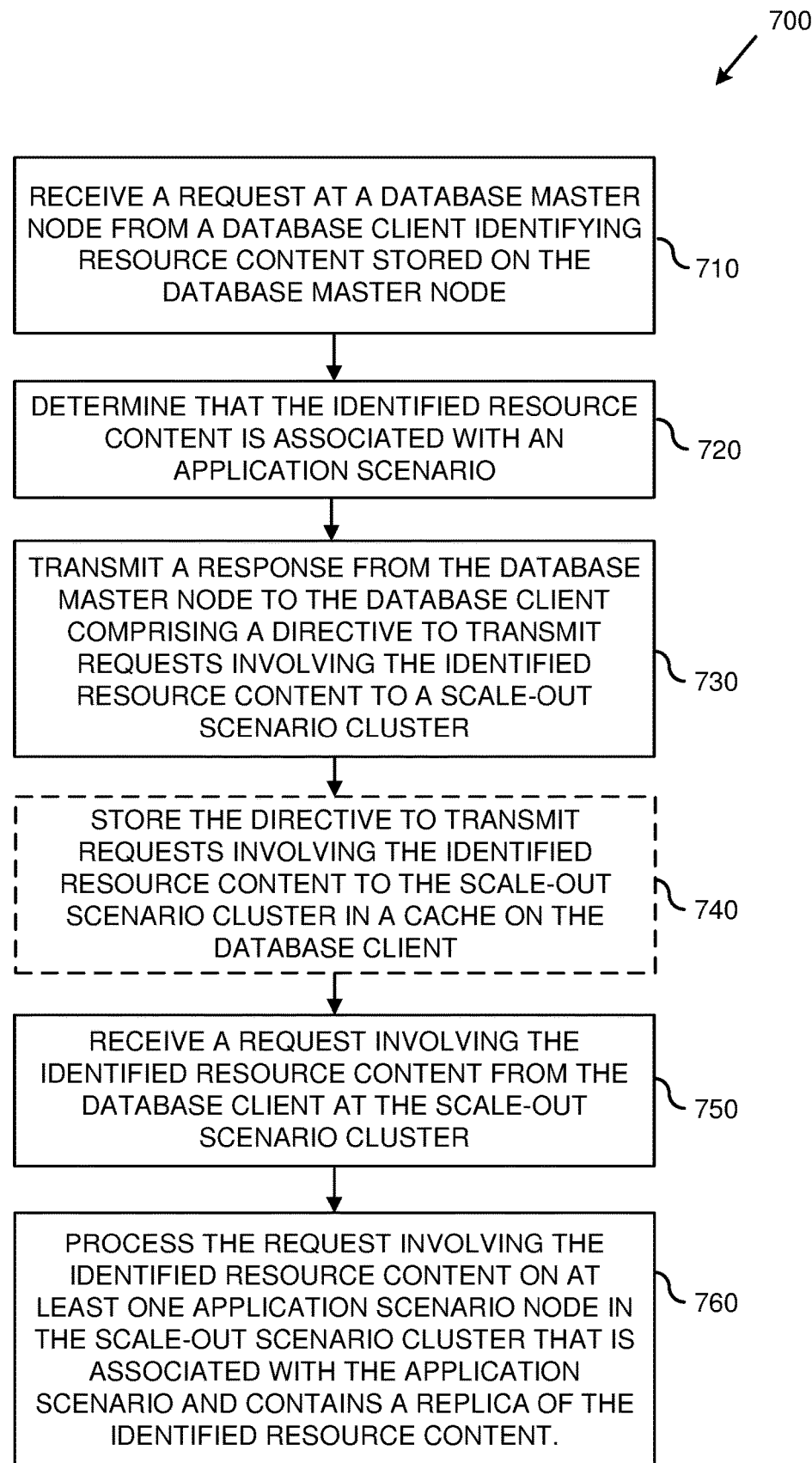
FIG. 7 is a flowchart depicting an example method of directing requests involving resource content associated with application scenarios to application scenario nodes.

FIG. 7 is a flowchart depicting an example method 700 of directing requests involving resource content associated with application scenarios to application scenario nodes that can be performed by any of the example systems described herein. At 710, a request is received at a master database node from a database client identifying resource content stored on the database master node.

At 720, the database master node determines that all or part of the identified resource content is associated with an application scenario. For example, the database master node may inspect one or more application scenario configurations to determine whether all or part of the resource content identified by the request is also identified in an application scenario configuration. If all or part of the resource content identified by the request is also identified in an application scenario configuration, then the database master node can determine that the identified resource content is associated with the application scenario associated with the application scenario configuration.

At 730, a response is transmitted from the database master node to the database client, the response comprising a directive to transmit requests involving the all or part of the identified resource content to a scale-out scenario cluster. A scale-out scenario cluster comprises multiple computing nodes configured to handle application requests and a request processor that receives requests and routes the received requests to available computing nodes. At least some of the computing nodes in the scale-out scenario cluster are assigned to application scenarios and are configured to process requests associated with the application scenarios. A computing node assigned to an application scenario can be configured to store resource content associated with the application scenario and to process a request associated with the application scenario using the stored resource content. The resource content associated with the application scenario that is contained by the computing node assigned to the application scenario is replicated from the database master node.

Optionally, at 740, the directive to transmit requests involving the identified resource content to the scale-out scenario cluster is stored in a cache on the database client. Before transmitting subsequent requests involving the identified resource content, the database client can refer to the cached directive instead of transmitting requests identifying the resource content to the database master node.

At 750, a request involving the identified resource content is received at the scale-out scenario cluster from the database client. At 760, the request involving the identified resource content is processed on at least one application scenario node in the scale-out scenario cluster that is associated with the application scenario and contains a replica of the identified resource content.

Example 13—Methods for Scaling Applications Using Application Scenario Configurations In any of the examples herein, a database server system can be provided for performing operations for scaling applications using one or more application scenario configurations.

Figure 8:
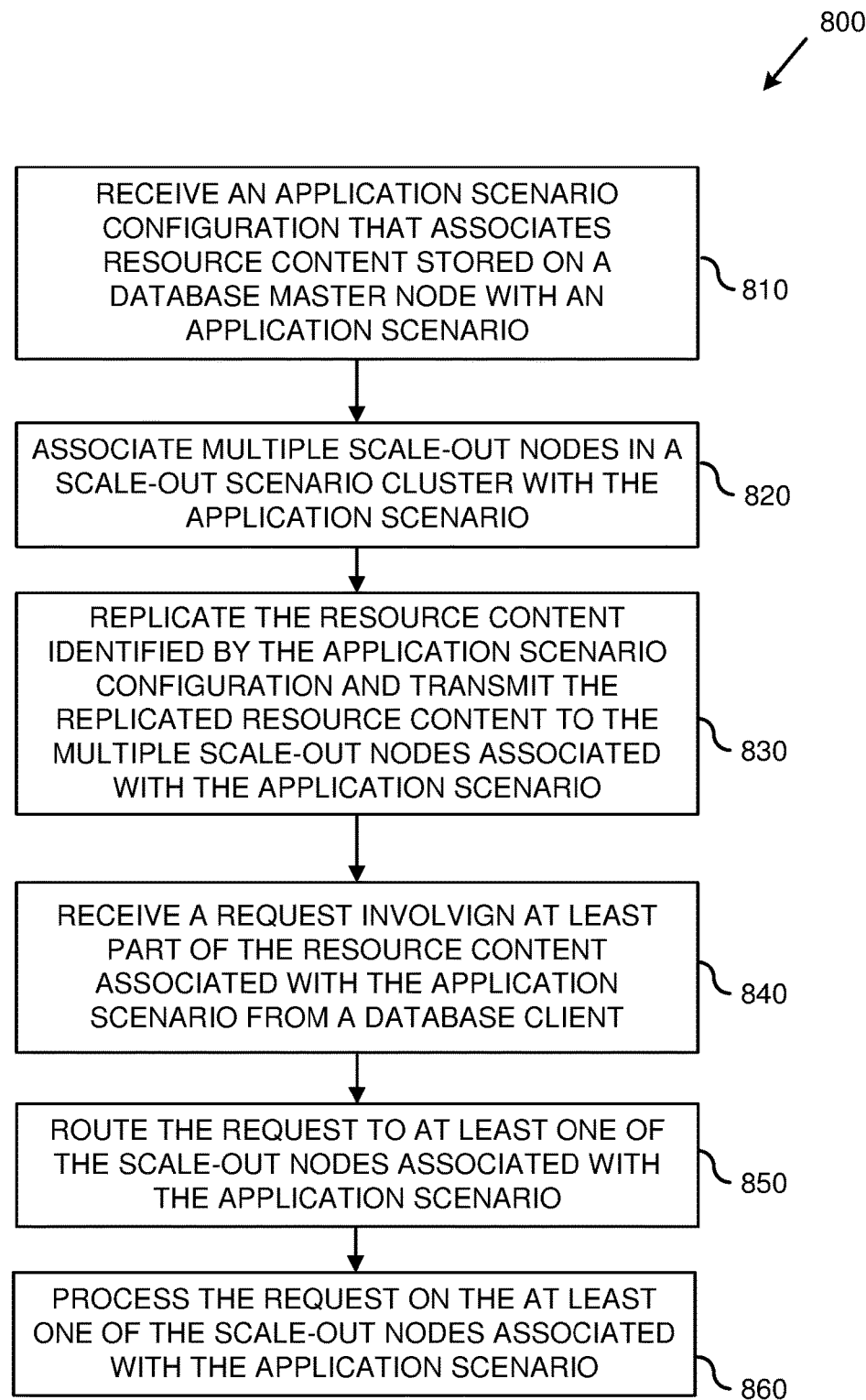
FIG. 8 is a flowchart depicting another example method of scaling an application by using an application scenario configuration.

FIG. 8 is a flowchart depicting an example method 800 of scaling an application by using an application scenario configuration that can be performed by any of the example systems described herein. At 810, a database master node receives an application scenario configuration that associates resource content stored on a database master node with an application scenario. The identified resource content can comprise at least part of at least one table stored on the database master node. The identified resource content can comprise one or more logic assets stored on the database master node, such as procedures, functions, subroutines, SQL scripts, views, triggers, executable programs, or the like. Some logic assets access and/or retrieve data stored in one or more tables or other logic assets. Data and/or logic assets accessed and/or retrieved by logic assets identified by the application scenario configuration can be identified by the application scenario configuration.

At 820, multiple scale-out nodes in a scale-out scenario cluster are associated with the application scenario. The scale-out scenario cluster can be a clustered computing environment and the scale-out nodes can be computing nodes in the clustered computing environment. The scale-out nodes can be associated with the application scenario by associating them with the application scenario configuration. The association between the application scenario configuration and the scale-out nodes can be tracked by the scale-out scenario cluster. The scale-out nodes can be computing nodes in the scale-out scenario cluster that are configured to process requests and, in some cases, transmit the results of the processing. The application scenario configuration can specify how many scale-out nodes are associated with the application scenario.

In some embodiments, the database master node can transmit a copy of the application scenario configuration to the scale-out scenario cluster, where it is stored on one or more of the scale-out nodes. In other embodiments, the application scenario configuration is stored in a location where it can be accessed by the database master node and one or more of the scale-out nodes.

At 830, the resource content stored on the database master node that is identified by the application scenario configuration is replicated and the replicated resource content is transmitted to the scale-out nodes associated with the application scenario.

At 840, a request is received from a database client for at least part of the resource content associated with the application scenario. For example, the request can be for data stored in one or more parts of one or more tables identified by the application scenario configuration. Alternatively or additionally, the request can be to access or execute one or more logic assets identified by the application scenario configuration.

At 850, the request is routed to at least one of the scale-out nodes associated with the application scenario. The request can be received by the database master node and routed to a distributed query processor in the scale-out scenario cluster that then routes the request to one or more of the scale-out nodes associated with the application scenario. The request can be received by the distributed query processor in the scale-out scenario cluster and then routed to one or more of the scale-out nodes associated with the application scenario. The distributed query processor can use the application scenario configuration to determine that the request is for resource content associated with the application scenario. The distributed query processor can select the one or more of the scale-out nodes associated with the application scenario that is available to process the request. The selecting can be based on various criteria, such as available capacity of the nodes, current request processing counts for the nodes, current resource utilization measurements of the nodes, or the like. After the one or more nodes associated with the application scenario have been selected, the distributed query processor can route the request to the selected nodes by transmitting all or part of the request to each selected node. At 860, the request is processed on the at least one of the scale-out nodes associated with the application scenario.

The application scenario configuration can be modified after it has been transmitted. The number and contents of the scale-out nodes associated with application scenario can be dynamically changed based on the modified application scenario configuration. For example, in some cases the application scenario configuration can be changed to identify different resource content associated with the application scenario. In such cases, the newly identified resource content can be replicated and transmitted to the scale-out nodes associated with the application scenario, where it can replace all or part of the previously replicated resource content stored on the nodes. In another scenario, the number of scale-out nodes specified by the application scenario configuration can be changed. The number of scale-out nodes associated with the application scenario in the scale-out scenario cluster is then adjusted to match the new number specified in the modified application scenario configuration.

In some cases, the number of scale-out nodes specified in the application scenario configuration is larger than a number of scale-out nodes available in the scale-out scenario cluster. In these cases, the scale-out scenario cluster can allocate additional scale-out nodes if necessary computing resources are available, and assign at least some of the newly allocated nodes to the application scenario, and copy the replicated resource content associated with the application scenario to the assigned newly allocated nodes. In further embodiments, the distributed query processor is configured to perform the allocating of the additional nodes.

Example 14—Example Computing Systems

Figure 9:
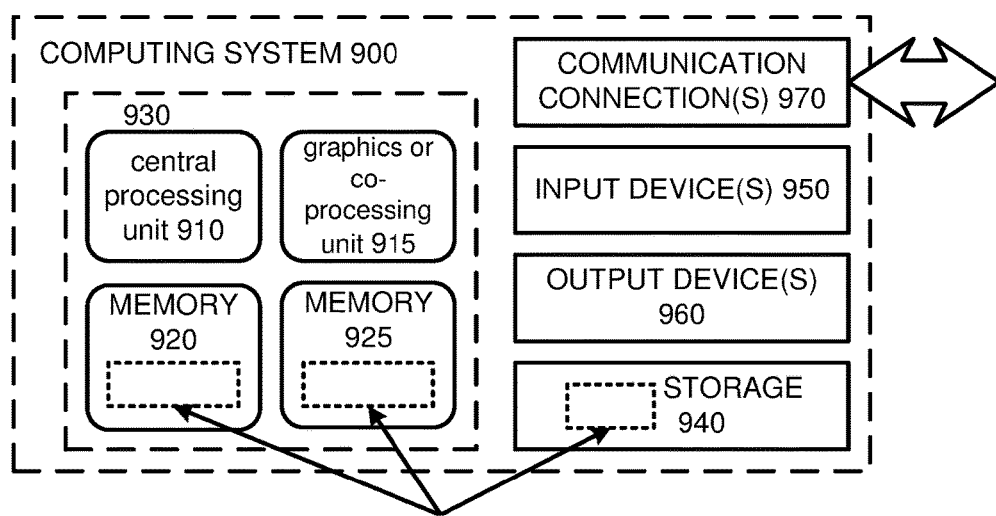
FIG. 9 is a block diagram of an example computing system in which some described embodiments can be implemented.

FIG. 9 depicts a generalized example of a suitable computing system 900 in which the described innovations may be implemented. The computing system 900 is not intended to suggest any limitation as to scope of use or functionality, as the innovations may be implemented in diverse general-purpose or special-purpose computing systems.

With reference to FIG. 9, the computing system 900 includes one or more processing units 910, 915 and memory 920, 925. In FIG. 9, this basic configuration 930 is included within a dashed line. The processing units 910, 915 execute computer-executable instructions. A processing unit can be a general-purpose central processing unit (CPU), processor in an application-specific integrated circuit (ASIC) or any other type of processor. In a multi-processing system, multiple processing units execute computer-executable instructions to increase processing power. For example, FIG. 9 shows a central processing unit 910 as well as a graphics processing unit or co-processing unit 915. The tangible memory 920, 925 may be volatile memory (e.g., registers, cache, RAM), non-volatile memory (e.g., ROM, EEPROM, flash memory, solid state drives, etc.), or some combination of the two, accessible by the processing unit(s). The memory 920, 925 stores software 980 implementing one or more innovations described herein, in the form of computer-executable instructions suitable for execution by the processing unit(s).

A computing system may have additional features. For example, the computing system 900 includes storage 940, one or more input devices 950, one or more output devices 960, and one or more communication connections 970. An interconnection mechanism (not shown) such as a bus, controller, or network interconnects the components of the computing system 900. Typically, operating system software (not shown) provides an operating environment for other software executing in the computing system 900, and coordinates activities of the components of the computing system 900.

The tangible storage 940 may be removable or non-removable, and includes magnetic disks, magnetic tapes or cassettes, solid state drives, CD-ROMs, DVDs, or any other medium which can be used to store information in a non-transitory way and which can be accessed within the computing system 900. The storage 940 stores instructions for the software 980 implementing one or more innovations described herein.

The input device(s) 950 may be a touch input device such as a keyboard, mouse, pen, or trackball, a voice input device, a scanning device, or another device that provides input to the computing system 900. For video encoding, the input device(s) 950 may be a camera, video card, TV tuner card, or similar device that accepts video input in analog or digital form, or a CD-ROM or CD-RW that reads video samples into the computing system 900. The output device(s) 960 may be a display, printer, speaker, CD-writer, or another device that provides output from the computing system 900.

The communication connection(s) 970 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

The innovations can be described in the general context of computer-executable instructions, such as those included in program modules, being executed in a computing system on a target real or virtual processor. Generally, program modules include routines, programs, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computing system.

For the sake of presentation, the detailed description uses terms like "determine" and "use" to describe computer operations in a computing system. These terms are high-level abstractions for operations performed by a computer, and should not be confused with acts performed by a human being. The actual computer operations corresponding to these terms vary depending on implementation.

Example 15—Example Cloud Computing Environment

Figure 10:
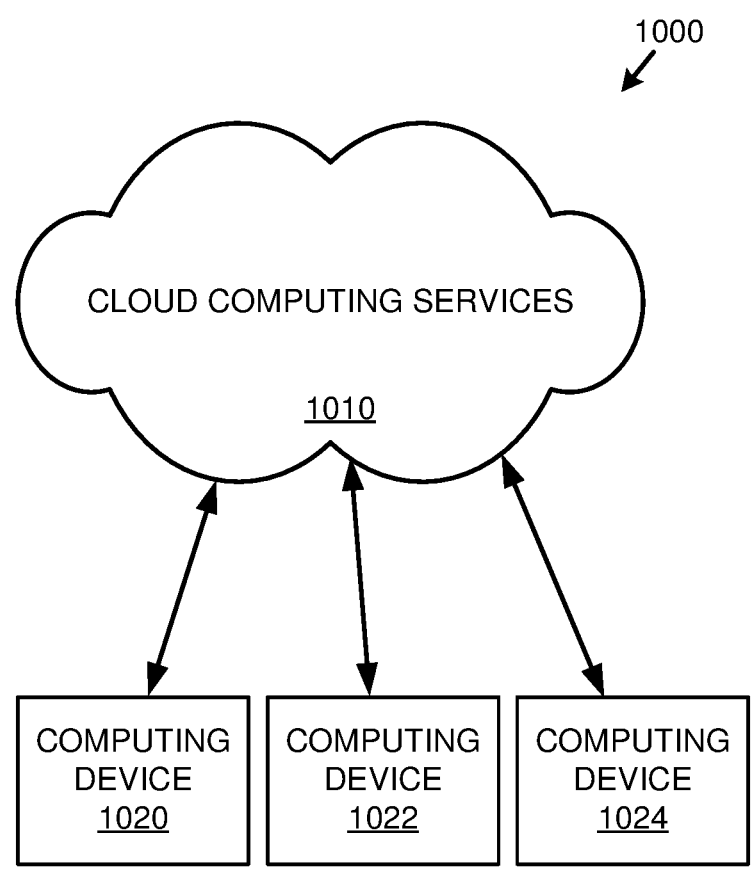
FIG. 10 is an example cloud computing environment that can be used in conjunction with the technologies described herein.

FIG. 10 depicts an example cloud computing environment 1000 in which the described technologies can be implemented. The cloud computing environment 1000 comprises cloud computing services 1010. The cloud computing services 1010 can comprise various types of cloud computing resources, such as computer servers, data storage repositories, networking resources, etc. The cloud computing services 1010 can be centrally located (e.g., provided by a data center of a business or organization) or distributed (e.g., provided by various computing resources located at different locations, such as different data centers and/or located in different cities or countries).

The cloud computing services 1010 are utilized by various types of computing devices (e.g., client computing devices), such as computing devices 1020, 1022, and 1024. For example, the computing devices (e.g., 1020, 1022, and 1024) can be computers (e.g., desktop or laptop computers), mobile devices (e.g., tablet computers or smart phones), or other types of computing devices. For example, the computing devices (e.g., 1020, 1022, and 1024) can utilize the cloud computing services 1010 to perform computing operators (e.g., data processing, data storage, and the like).

Example 16—Example Implementations

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions or a computer program product stored on one or more computer-readable storage media and executed on a computing device (e.g., any available computing device, including smart phones or other mobile devices that include computing hardware). Computer-readable storage media can include any tangible media that can be accessed within a computing environment (e.g., one or more optical media discs such as DVD or CD, volatile memory components (such as DRAM or SRAM), or non-volatile memory components (such as flash memory, solid state drives, or magnetic media such as hard drives)). By way of example and with reference to FIG. 9, computer-readable storage media include memory 920 and 925, and storage 940. The term computer-readable storage media does not include signals and carrier waves. In addition, the term computer-readable storage media does not include communication connections (e.g., 970).

Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

The disclosed technology is not limited to any specific computer language or program. For instance, the disclosed technology can be implemented by software written in C++, Java, Perl, JavaScript, Adobe Flash, or any other suitable programming language. Likewise, the disclosed technology is not limited to any particular computer or type of hardware.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and sub combinations with one another. The disclosed methods, apparatus, and systems are not limited to any specific aspect or feature or combination thereof, nor do the disclosed embodiments require that any one or more specific advantages be present or problems be solved.

The technologies from any example can be combined with the technologies described in any one or more of the other examples. In view of the many possible embodiments to which the principles of the disclosed technologies may be applied, it should be recognized that the illustrated embodiments are examples of the disclosed technologies and should not be taken as a limitation on the scope of the disclosed technologies. Rather, the scope of the disclosed technologies includes what is covered by the scope and spirit of the following claims.

What is claimed is:

1. A method of scaling an application based on application scenarios, implemented by at least one computing device, the method comprising:
   storing a plurality of tables associated with an application in a database master node of a database server system;
   storing multiple logic assets associated with the application in the database master node;
   receiving an application scenario configuration that defines an application scenario and identifies a subset of the plurality of tables and an application request type, wherein the application scenario represents an identifiable portion of functionality of the application that uses data in the identified subset of the plurality of tables;
   associating the subset of the plurality of tables and the application request type with the application scenario;
   associating a subset of the multiple logic assets with the application scenario;
   replicating the subset of the plurality of tables to multiple application scenario nodes in the database server system, wherein the multiple application scenario nodes are associated with the application scenario;
   replicating the subset of the multiple logic assets to the multiple application scenario nodes;
   receiving a request for data in the database server system, wherein the received request for data comprises a request to execute a logic asset;
   determining that the request for data is a request of the request type associated with the application scenario, wherein the determining comprises determining that the logic asset requested to be executed is one of the subset of the multiple logic assets associated with the application scenario; and
   processing the request for data on one or more of the multiple application scenario nodes, wherein processing the request comprises accessing replicas of the data in the subset of the plurality of tables stored on the one or more of the multiple application scenario nodes and executing a replica of the requested logic asset on the one or more of the multiple application scenario nodes.

2. The method of claim 1, wherein the data from the subset of the plurality of tables comprises:
   at least one row, from the subset of the plurality of tables, designated as associated with the application scenario; or
   at least one column, from the subset of the plurality of tables, designated as associated with the application scenario.

3. The method of claim 1, wherein:
   the multiple application scenario nodes are a first set of application scenario nodes, and the database server system further comprises:
   a second set of multiple application scenario nodes storing replicas of data from a second subset of the plurality of tables associated with the application, wherein the data from the second subset of the one or more tables are associated with a second application scenario; and
   the method further comprises:
   changing a number of the second set of multiple application scenario nodes associated with the second application scenario without changing a number of the multiple application scenario nodes associated with the application scenario.

4. The method of claim 1, wherein:
   The data from the subset of the plurality of tables is selected based on a filter criteria associated with the application scenario.

5. The method of claim 1, further comprising:
   changing data stored in one or more of the plurality of tables stored on the database master node associated with the application;
   determining that at least part of the changed data is part of the data associated with the application scenario; and
   replicating the at least part of the changed data to the one or more of the multiple application scenario nodes.

6. The method of claim 1, wherein:
   the application scenario configuration specifies a number of the multiple application scenario nodes that store the replicas of the data associated with the application scenario; and
   the method further comprises:
   changing the number of the multiple application scenario nodes that are specified by the application scenario configuration, and
   changing the number of the application scenario nodes that store the replicas of the data associated with the application scenario to match the number of the multiple application scenario nodes are specified by the application scenario configuration.

7. The method of claim 1 further comprising:
   receiving a second application scenario configuration in the database server system, wherein the second application scenario configuration associates data from a second subset of the plurality of tables stored on the database master node with a second application scenario;

allocating a second multiple application scenario nodes associated with the second application scenario;

replicating the data from the second subset of the plurality of tables associated with the second application scenario to the second multiple application scenario nodes;

receiving a second request for data in the database server system;

determining that the request is for data associated with the second application scenario using the second application scenario configuration; and processing the second request on one or more of the second multiple application scenario nodes, wherein processing the second request comprises accessing at least part of the replicated data from the second subset of the plurality of tables stored on the one or more of the second multiple application scenario nodes.

8. The method of claim 1, wherein the subset of the logic assets associated with the application scenario comprises:
one or more procedures;
one or more functions;
one or more views;
one or more scripts; or
one or more executable programs.

9. The method of claim 1, wherein:
the subset of the logic assets are associated with the application scenario using the application scenario configuration.

10. The method of claim 9, wherein the determining further comprises:
determining that the logic asset requested to be executed is one of the subset of logic assets associated with the application scenario by using the application scenario configuration.

11. A database server system comprising:
a database master server comprising a processing unit and a memory, wherein the memory stores instructions that, when executed by the processing unit, cause the database master server to perform operations, the operations comprising:
storing resource content associated with an application comprising a plurality of database tables,
storing a plurality of logic assets associated with the application,
receiving an application scenario configuration that defines an application scenario and identifies a subset of the plurality of database tables and an application request type, wherein the application scenario represents an identifiable portion of functionality of the application that uses data in the identified subset of the plurality of database tables,
associating the subset of the plurality of database tables and the application request type with the application scenario,
associating a subset of the plurality of logic assets with the application scenario,
replicating the subset of the plurality of database tables to a plurality of application scenario servers associated with the application scenario,
replicating the subset of the plurality of logic assets to the plurality of application scenario servers associated with the application scenario,
receiving requests associated with the application, wherein the requests comprise requests to execute logic assets, and
determining that the requests are requests of the request type associated with the application scenario, wherein the determining comprises determining that the logic assets requested to be executed are in the subset of the plurality of logic assets associated with the application scenario; and the plurality of application scenario servers, wherein the application scenario servers comprise additional processing units and additional memories, wherein the additional memories store instructions that, when executed by the additional processing units, configure the application scenario servers to perform operations, the operations comprising:
storing replicas of the subset of the plurality of database tables associated with the application scenario,
storing replicas of the subset of the plurality of logic assets associated with the application scenario, and
processing the requests of the request type associated with the application scenario using the replicas of the subset of the plurality of database tables associated with the application scenario, wherein the processing comprises executing the replicas of the subset of the plurality of logic assets associated with the application scenario.

12. The database server system of claim 11, wherein:
the database server system further comprises a distributed content replicator server comprising a processing unit and a memory, the memory storing instructions that, when executed by the processing unit, cause the distributed content replicator server to perform operations, the operations comprising:
receiving the replicas of the subset of the plurality of database tables from the database master server,
determining that the replicas of the subset of the plurality of database tables are associated with the application scenario,
identifying the plurality of application scenario servers associated with the application scenario, and
transmitting the replicas of the subset of the plurality of database tables associated with the application scenario to the plurality of application scenario server associated with the application scenario; and
the operations performed by the database master server further comprise:
transmitting the replicas of the subset of the plurality of database tables to the distributed content replicator server.

13. The database server system of claim 12, wherein the operations performed by the database master server further comprise:
receiving a request to alter resource content stored on the database master server;
processing the request by altering data stored on the database master server in the subset of the plurality of database tables that are associated with the application scenario;
replicating the altered data; and
transmitting the altered data to the distributed content replicator.

14. The database server system of claim 11, wherein:
the operations performed by the database master server further comprise:
receiving a request from a database client identifying resource content stored on the database master server,
determining that the identified resource content comprises data stored in the subset of the plurality of database tables that are associated with the application scenario, and transmitting a response to the database client comprising a directive to transmit requests involving the identified resource content to one or more of the plurality of application scenario servers; and wherein the database server system further comprises a distributed request processor configured to perform operations comprising:
receiving a request from the database client involving the identified resource content,
identifying one or more of the plurality of application scenario servers associated with the application scenario that is available for processing requests, and
routing the request involving the identified resource content to the identified one or more of the plurality of application scenario servers for processing.

15. The database server system of claim 14, wherein the distributed request processor is further configured to perform operations comprising:
changing a number of application scenario servers associated with the application scenario, wherein changing the number of application scenario servers comprises:
allocating additional servers in a clustered computing system, associating the allocated servers with the application scenario, and copying the replicated subset of the plurality of tables associated with the application scenario to the allocated servers.

16. The database server system of claim 11, wherein:
the database master server determines whether a request for resource content is associated with the application scenario by determining whether the requested resource content comprises data in the subset of the plurality of tables identified by the application scenario configuration.

17. One or more computer-readable storage media storing computer-executable instructions causing one or more computing devices to perform a method of scaling an application based on application scenarios, the method comprising:
storing a plurality of tables associated with an application in a database master node of a database server system;
storing multiple logic assets associated with the application in the database master node;
receiving an application scenario configuration that defines an application scenario and identifies a subset of the plurality of tables and an application request type, wherein the application scenario represents an identifiable portion of functionality of the application that uses data in the identified subset of the plurality of tables;
associating the subset of the plurality of tables and the application request type with the application scenario;
associating a subset of the multiple logic assets with the application scenario;
replicating the subset of the plurality of tables to multiple application scenario nodes in the database server system, wherein the multiple application scenario nodes are associated with the application scenario;
replicating the subset of the multiple logic assets to the multiple application scenario nodes;
receiving a request for data in the database server system, wherein the received request for data comprises a request to execute a logic asset;
determining that the request for data is a request of the request type associated with the application scenario, wherein the determining comprises determining that the logic asset requested to be executed is one of the subset of the multiple logic assets associated with the application scenario; and
processing the request for data on one or more of the multiple application scenario nodes, wherein processing the request comprises accessing replicas of the data in the subset of the plurality of tables stored on the one or more of the multiple application scenario nodes and executing a replica of the requested logic asset on the one or more of the multiple application scenario nodes.

18. The one or more computer-readable storage media of claim 17, wherein:
the subset of the logic assets are associated with the application scenario using the application scenario configuration.

* * * * *